(12) United States Patent
Kim

(10) Patent No.: US 8,953,260 B2
(45) Date of Patent: Feb. 10, 2015

(54) TELEPHOTO LENS SYSTEM

(71) Applicant: Samsung Electronics Co., Ltd., Suwon-si, Gyeonggi-do (KR)

(72) Inventor: Yong-su Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 75 days.

(21) Appl. No.: 13/759,414

(22) Filed: Feb. 5, 2013

(65) Prior Publication Data
US 2013/0314588 A1   Nov. 28, 2013

(30) Foreign Application Priority Data

May 22, 2012   (KR) .................. 10-2012-0054450

(51) Int. Cl.
*G02B 13/02*   (2006.01)

(52) U.S. Cl.
USPC ........... 359/748; 359/716; 359/740; 359/745; 359/785

(58) Field of Classification Search
USPC ................. 359/716, 740, 745, 748, 785
See application file for complete search history.

(56) References Cited

U.S. PATENT DOCUMENTS

| 5,757,555 A | 5/1998 | Sato |
| 6,317,275 B1 | 11/2001 | Yoneyama |
| 6,532,342 B2 | 3/2003 | Yoneyama |
| 7,489,452 B2 * | 2/2009 | Yamamoto et al. ........... 359/687 |

FOREIGN PATENT DOCUMENTS

| JP | 3254239 B2 | 2/2002 |
| JP | 3445554 B2 | 9/2003 |
| JP | 4666748 B2 | 4/2011 |
| JP | 2011-102906 A | 5/2011 |

OTHER PUBLICATIONS

Search Report established for EP 13150120.7 (Jul. 25, 2013).

* cited by examiner

*Primary Examiner* — Evelyn A. Lester
(74) *Attorney, Agent, or Firm* — Drinker Biddle & Reath LLP

(57) ABSTRACT

A telephoto lens system including a first lens group having a positive refractive power and including a negative lens that is disposed closest to an object side and has a meniscus shape that is convex toward the object side; a second lens group having a negative refractive power and including a single negative lens that moves along an optical axis and performs focusing; and a third lens group having a positive refractive power, wherein the first through third lens groups are disposed sequentially from the object side toward the image side, and the telephoto lens system satisfies the following condition, $0.5<|f_2/f|<0.81$, wherein, $f_2$ denotes the focal length of the second lens group, and f denotes the focal length of the telephoto lens system.

12 Claims, 8 Drawing Sheets

TELEPHOTO LENS SYSTEM

CROSS-REFERENCE TO RELATED PATENT APPLICATION

This application claims the benefit of Korean Patent Application No. 10-2012-0054450, filed on May 22, 2012, in the Korean Intellectual Property Office, the disclosure of which is incorporated herein in its entirety by reference.

BACKGROUND

Embodiments relate to an inner-focusing type telephoto lens system used in digital still cameras or digital video cameras.

Recently, as demand for interchangeable lens digital cameras increase, image sensors such as a charge coupled device (CCD) or a complementary metal-oxide semiconductor (CMOS) used in digital cameras have a high pixel resolution with developments in technology.

In order to complement the high resolution image sensors, a lens used in an interchangeable lens digital camera should have excellent optical properties and a compact size for portability.

Also, most interchangeable lens digital cameras that have been recently released have a basic movie shooting function and require rapid and precise focusing during movie shooting. In order to satisfy the rapid and precise focusing of the interchangeable lens digital cameras, the interchangeable lens digital cameras need to have a light-weight focusing lens group capable of moving according to a location of an object.

Conventionally, a double Gauss type optical system is mainly used as a single focus semi-telephoto lens having an F-number equal to or less than about 2.0 in an interchangeable lens digital camera. Although it is possible to effectively decrease spherical aberration that is a major problem in a large aperture lens system via the double Gauss type optical system, performance of the double Gauss type optical system is deteriorated due to occurrence of a coma flare. Also, the double Gauss type optical system generally is based on the movement of an entire lens group, for correction of a change of image surface according to a variation in a location of an object, and thus the weight of a focusing group is increased, thereby decreasing focusing speed.

SUMMARY

Embodiments relate to an inner-focusing type telephoto lens system having a large aperture capable of performing stable auto focusing.

According to an embodiment, there is provided a telephoto lens system including: a first lens group having a positive refractive power and including a negative lens that is disposed closest to the object side and has a meniscus shape that is convex toward the object side; a second lens group having a negative refractive power and including a single negative lens that moves along the optical axis and performs focusing; and a third lens group having a positive refractive power, wherein the first through third lens groups are disposed sequentially from the object side toward the image side, and the telephoto lens system satisfies the following condition:

$$0.5 < |f_2/f| < 0.81,$$

wherein $f_2$ denotes the focal length of the second lens group, and f denotes the focal length of the telephoto lens system.

A positive lens having a convex shape toward the object side may be disposed at the closest position to the object side in the third lens group.

An Abbe number $vd_2$ of the second lens group may satisfy the following condition, $vd_2 > 63$.

The telephoto lens system may satisfy the following condition:

$$nd_3 > 1.78,$$

wherein $nd_3$ denotes an average of refractive indexes of lenses constituting the third lens group.

The telephoto lens system may further include an aperture diaphragm interposed between the second lens group and the third lens group.

The first lens group may include a negative lens having a meniscus shape, a positive lens, and a positive lens that are sequentially arranged from the object side to the image side. The third lens group may include a positive lens, a positive lens, and a negative lens that are sequentially arranged from the object side to the image side.

According to another aspect of the present invention, there is provided an imaging apparatus including: the telephoto lens system of claim 1; and an imaging device converting an optical image formed by the telephoto lens system into an electrical signal.

BRIEF DESCRIPTION OF THE DRAWINGS

The above and other features and advantages will become more apparent from the detailed description of exemplary embodiments thereof with reference to the attached drawings in which.

DETAILED DESCRIPTION

Figure 1:
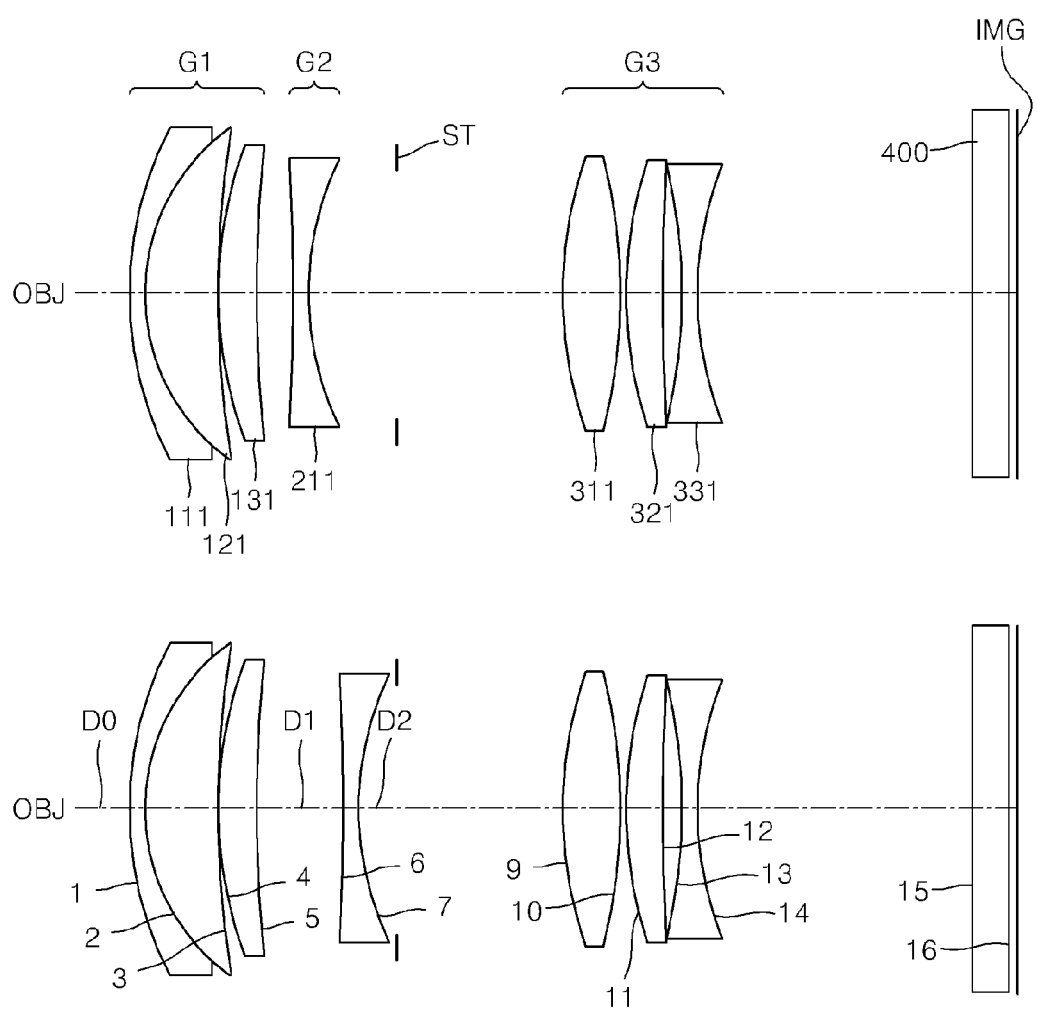
FIG. 1 is a view showing an optical arrangement of a telephoto lens system when an object is located at an infinite and nearest positions, according to an embodiment.

The following is a detailed description of exemplary embodiments with reference to the attached drawings. The same reference numerals in the drawings denote the same element. In the drawings, the thicknesses of layers and regions may be exaggerated for clarity.

FIGS. 1, 3, 5, and 7 are views showing an optical arrangement of a telephoto lens system when an object is located at an infinite and a close range, according to embodiments of the present invention.

The telephoto lens system is a semi-telephoto lens having a large aperture. The telephoto lens system provides an optical system that is appropriate for auto-focusing because a single lens moves during focusing for correcting an image surface according to a change in a location of an object and the optical system may perform inner-focusing not causing a change in the overall length during focusing.

The telephoto lens system according to the current embodiment includes a first lens group G1 having a positive refractive power, a second lens group G2 that has a negative refractive power, moves along the optical axis, and performs focusing, and a third lens group G3 having a positive refractive power, wherein the first to third lens groups G1 to G3 are sequentially arranged toward an image side IMG from an object side OBJ. The telephoto lens system may further include an aperture diaphragm ST between the second lens group G2 and the third lens group G3. A filter 400 is disposed at the image side IMG of the third lens group G3.

A negative lens having a meniscus shape convex toward the object side OBJ is disposed at a position closest to the object side OBJ in the first lens group G1. The second lens group G2 includes a single negative lens which moves along the optical axis for performing focusing.

In general, conventional semi-telephoto lens optical systems having a large aperture are mainly a double Gauss type optical system for effective correction of spherical aberration. In such a double Gauss type optical system, the entire optical system or a plurality of lenses move along the optical axis during focusing, and thus the focusing speed is decreased due to an increase in weight of a focusing lens group, and coma flare occurs.

In the current embodiment, weight reduction of a focusing lens group is realized by constructing an optical system including the first to third lens groups G1 to G3 that have positive, negative and positive refractive powers and utilizing the second lens group G2 consisting of a single lens to the focusing lens group.

The telephoto lens system of the current embodiment satisfies the following condition:

$$0.5 < |f_{2/f}| < 0.81$$

wherein $f_2$ denotes the focal length of the second lens group G2, and f denotes the focal length of the telephoto lens system.

The above-described embodiment provides an optimized condition to increase focusing speed by suitably setting an amount of movement of the focusing lens group. If the telephoto lens system deviates from the upper limit of the above-described condition, it is advantageous to correct aberration by using only a single lens, but the refractive power of the focusing lens group is decreased, thereby increasing the amount of movement of the focusing lens group during focusing. Thus, the space in which the focusing lens group may move should be increased, thereby making it difficult to configure a compact optical system. Also, it is difficult to secure a minimum photographing distance due to a limitation in the available space of the focusing lens group to move.

If the telephoto lens system deviates from the lower limit, it is advantageous to configure a compact optical system because an amount of movement of the focusing lens group may be decreased during focusing. However, sensitivity of a change in focus with respect to the amount of movement of the focusing lens group during focusing is greatly increased, and thus it is difficult to precisely adjust focus. Also, it is difficult to correct spherical aberration, and astigmatic field curvature is greatly changed while focusing.

Also, in the telephoto lens system of the current embodiment, the negative lens having a meniscus shape convex toward the object side OBJ is disposed at a position closest to the object side OBJ in the first lens group G1, so that the telephoto lens system may obtain an improved back focal length compared to a conventional double Gauss type optical system.

In the third lens group G3, a convex lens is disposed closest to the object side OBJ so as to decrease an incident angle of a lower light beam of an extra-axial light beam passing through the second lens group G2 and incident to a surface of the lens closest to the object side OBJ in the third lens group, thereby reducing occurrence of coma flare.

Also, in the telephoto lens system of the current embodiment, an Abbe number $vd_2$ may satisfy the following condition:

$$vd_2 > 63.$$

A low dispersion lens may be used to correct chromatic aberration that frequently occurs in an optical system having a large aperture, and the above-described condition defines an optimized condition.

Also, the telephoto lens system of the current embodiment may satisfy the following condition:

$$nd_3 > 1.78$$

wherein $nd_3$ denotes an average of refractive indexes of lenses constituting the third lens group G3.

The above-described condition limits a range of an average refractive index of the third lens group G3. If lenses disposed at an image side IMG with respect to the aperture diaphragm ST are formed of a material having a high refractive index to compensate for Petzval's sum, the radius of curvature of the lens may be increased, and thus the occurrence of spherical aberration or astigmatic field curve may be decreased, and also the occurrence of coma flare may be decreased.

Hereinafter, configurations of lenses constituting each lens group and lens data according to embodiments will be described. In the lens data, ST denotes an aperture diaphragm, EFL denotes the entire focal length, Fno denotes an F number, and 2ω denotes a viewing angle. R, Th, nd, and vd denote a radius of curvature, a thickness of a lens or a distance between lenses, a refractive index, and an Abbe number, respectively. D0, D1, and D2 denote a variable distance according to focusing. In the lens data, a unit of distance is mm.

<First Embodiment>

FIG. 1 is a view showing an embodiment of an optical arrangement of a telephoto lens system when an object is located at an infinite and nearest positions. The telephoto lens system includes a first lens group G1 having a positive refractive power, a second lens group G2 having a negative refractive power, and a third lens group G3 having a positive refractive power. The first lens group G1 includes a first lens 111, which is a negative lens having a meniscus shape, a second lens 121 which is a positive lens, and a third lens 131 which is a negative lens. The first lens 111 and the second lens 121 together form a cemented lens. The second lens group G2 includes a fourth lens 211 which is a negative lens. The third lens group G3 includes a fifth lens 311 which is a positive lens having a convex shape toward an object side, a sixth lens 321 which is a positive lens, and a seventh lens 331 which is a negative lens having a bi-concave shape.

The lens data is as follows.

| \multicolumn{5}{c}{EFL: 46.33 mm Fno: 1.84 2ω: 35.1°} | | | | |
|---|---|---|---|---|
| Surface | R | Th | nd | vd |
| 0 | INFINITY | D0 | | |
| 1 | 27.807 | 1.30 | 1.87387 | 28.7 |
| 2 | 16.174 | 5.49 | 1.7139 | 53.2 |
| 3 | 60.506 | 0.10 | | |
| 4 | 33.390 | 2.87 | 1.79824 | 45.1 |
| 5 | 94.571 | D1 | | |
| 6 | −156.340 | 1.20 | 1.61799 | 63.4 |
| 7 | 22.456 | D2 | | |
| ST | INFINITY | 12.88 | | |
| 9 | 34.750 | 4.41 | 1.83481 | 42.7 |
| 10 | −44.687 | 0.50 | | |
| 11 | 33.660 | 2.94 | 1.83481 | 42.7 |
| 12 | 287.183 | 1.34 | | |
| 13 | −43.649 | 1.20 | 1.76495 | 24.9 |
| 14 | 24.240 | 21.48 | | |
| 15 | INFINITY | 2.80 | 1.51679 | 64.2 |
| 16 | INFINITY | 0.12 | | |
| IMG | | | | |

TABLE 1

| | Infinite range | Close range |
|---|---|---|
| D0 | INFINITY | 407.1 |
| D1 | 2.99 | 7.01 |
| D2 | 6.81 | 2.78 |

Figure 2:
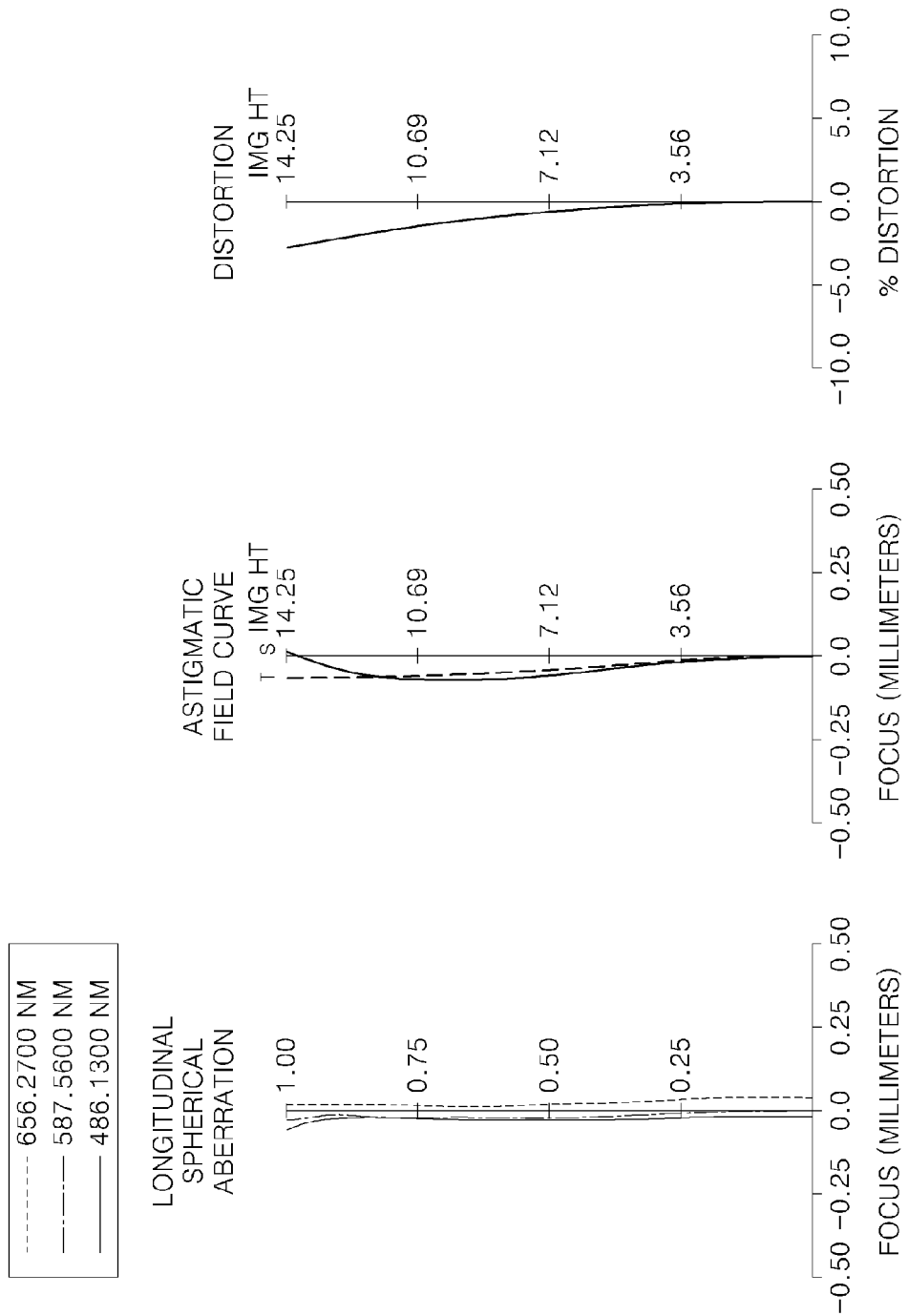
FIG. 2 shows aberration diagrams of spherical aberration, astigmatic field curve, and distortion when an object is located at an infinite position in the telephoto lens system of FIG. 1.

FIG. 2 shows aberration diagrams of longitudinal spherical aberration, astigmatic field curve, and distortion when an object is located at an infinite position in the telephoto lens system of FIG. 1.

The spherical aberration is shown with respect to light having wavelengths of 656.2700 nm, 587.5600 nm, and 486.1300 nm, and astigmatism and distortion show light having a wavelength of 587.5600 nm. In the astigmatism, T and S denote curves at a tangential surface and a sagittal surface, respectively.

<Second Embodiment>

Figure 3:
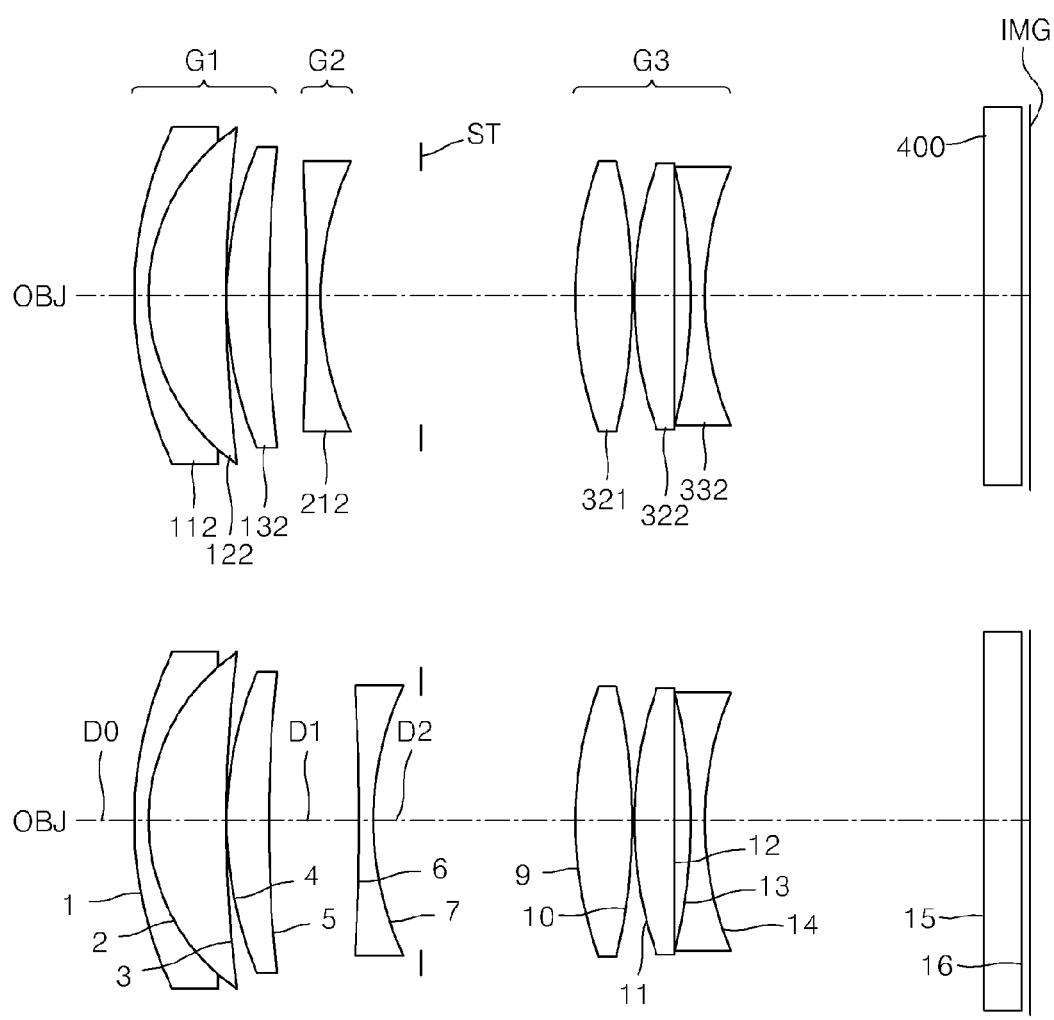
FIG. 3 is a view showing an optical arrangement of a telephoto lens system when an object is located at an infinite and nearest positions, according to another embodiment.

FIG. 3 is a view showing another embodiment of an optical arrangement of a telephoto lens system when an object is located at an infinite and nearest positions. The telephoto lens system includes a first lens group G1 having a positive refractive power, a second lens group G2 having a negative refractive power, and a third lens group G3 having a positive refractive power. The first lens group G1 includes a first lens 112 which is a negative lens having a meniscus shape, a second lens 122 which is a positive lens, and a third lens 132 which is a negative lens. The first lens 112 and the second lens 122 together form a cemented lens. The second lens group G2 includes a fourth lens 212 which is a negative lens. The third lens group G3 includes a fifth lens 312 which is a positive lens having a convex shape toward an object side, a sixth lens 322 which is a positive lens, and a seventh lens 332 which is a negative lens having a bi-concave shape.

The lens data is as follows.

| \multicolumn{5}{c}{EFL: 44.9 mm Fno: 1.85 2ω: 36.2°} | | | | |
|---|---|---|---|---|
| Surface | R | Th | nd | Vd |
| 0 | INFINITY | D0 | | |
| 1 | 29.510 | 1.10 | 1.80610 | 33.3 |
| 2 | 15.296 | 5.65 | 1.69680 | 55.5 |
| 3 | 62.949 | 0.10 | | |
| 4 | 28.553 | 3.12 | 1.71300 | 53.9 |
| 5 | 90.302 | D1 | | |
| 6 | −198.933 | 1.10 | 1.61800 | 63.4 |
| 7 | 20.997 | D2 | | |
| ST | INFINITY | 11.49 | | |
| 9 | 33.261 | 4.31 | 1.83481 | 42.7 |
| 10 | −40.992 | 0.10 | | |
| 11 | 32.698 | 2.95 | 1.77250 | 49.6 |
| 12 | 721.470 | 1.25 | | |
| 13 | −39.275 | 1.10 | 1.76182 | 26.6 |
| 14 | 23.530 | 20.70 | | |
| 15 | INFINITY | 2.80 | 1.51680 | 64.2 |
| 16 | INFINITY | 0.69 | | |
| IMG | | | | |

TABLE 2

| | Infinite range | Close range |
|---|---|---|
| D0 | Infinity | 394.65 |
| D1 | 2.89 | 6.91 |
| D2 | 7.41 | 3.4 |

Figure 4:
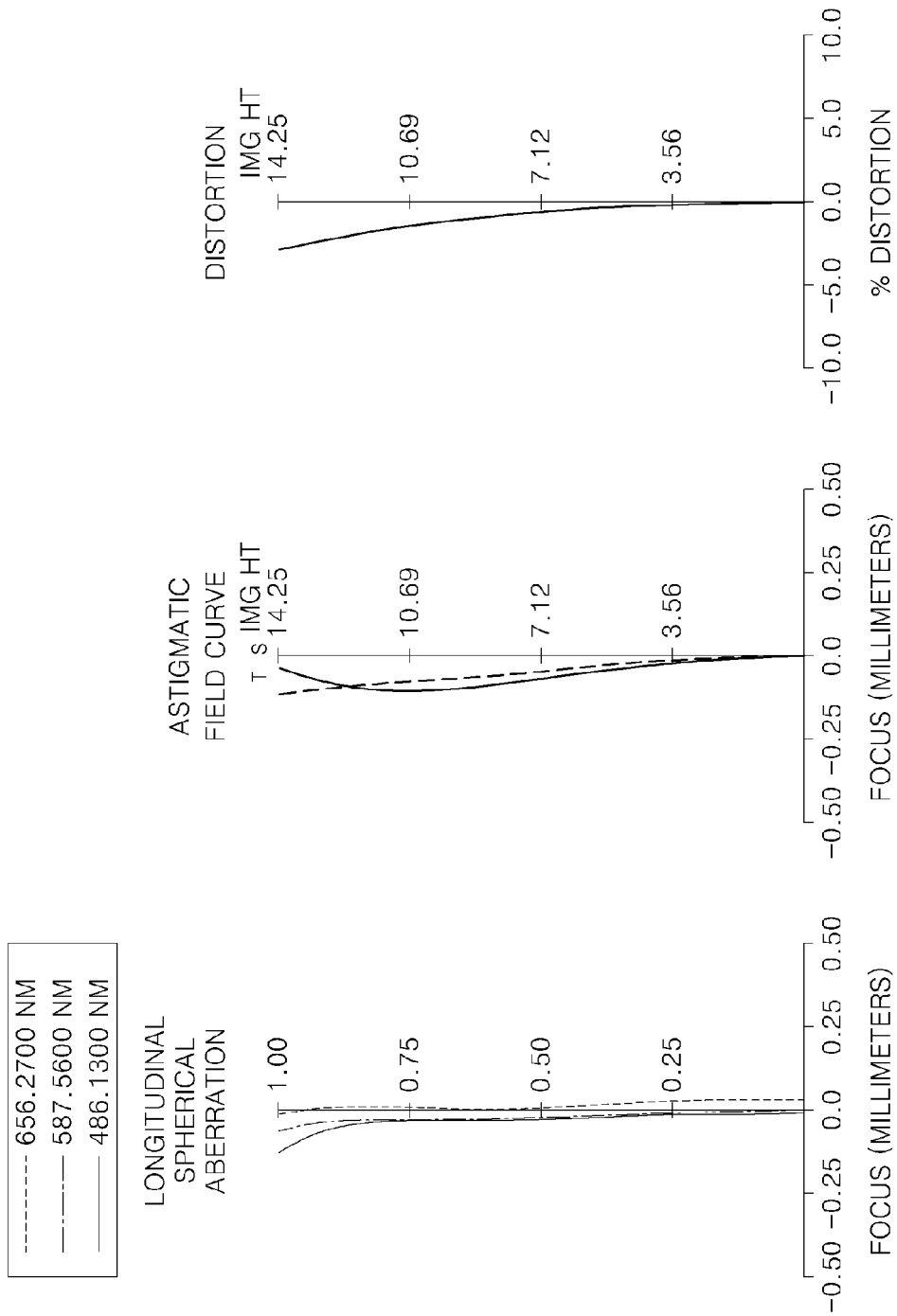
FIG. 4 shows aberration diagrams of spherical aberration, astigmatic field curve, and distortion when an object is located at an infinite position in the telephoto lens system of FIG. 3.

FIG. 4 shows aberration diagrams of longitudinal spherical aberration, astigmatic field curve, and distortion when an object is located at an infinite position in the telephoto lens system of FIG. 3

<Third Embodiment>

Figure 5:
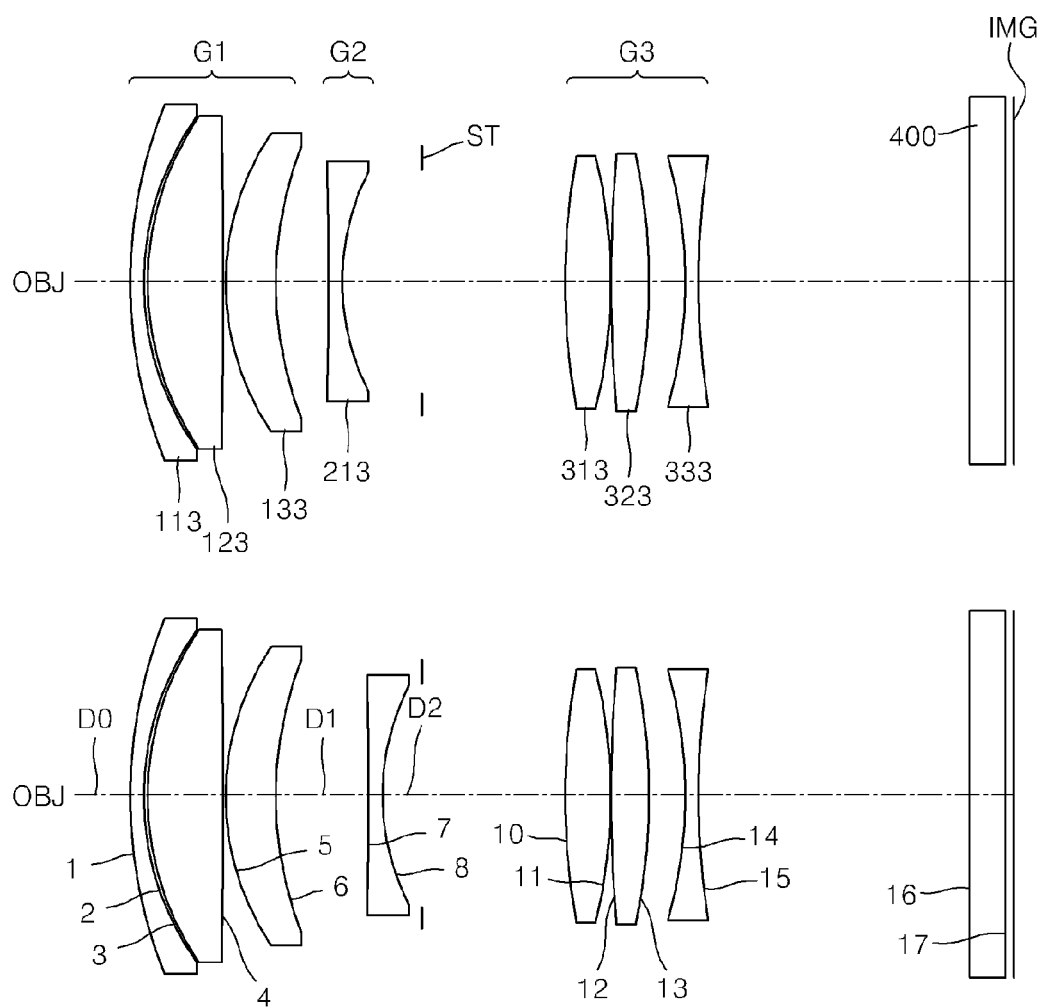
FIG. 5 is a view showing an optical arrangement of a telephoto lens system when an object is located at an infinite and nearest positions, according to another embodiment.

FIG. 5 is a view showing another embodiment of an optical arrangement of a telephoto lens system when an object is located at an infinite and nearest positions. The telephoto lens system includes a first lens group G1 having a positive refractive power, a second lens group G2 having a negative refractive power, and a third lens group G3 having a positive refractive power. The first lens group G1 includes a first lens 113 which is a negative lens having a meniscus shape, a second lens 123 which is a positive lens, and a third lens 133 which is a negative lens. The second lens group G2 includes a fourth lens 213 which is a negative lens. The third lens group G3 includes a fifth lens 313 which is a positive lens having a convex shape toward an object side, a sixth lens 323 which is a positive lens, and a seventh lens 333 which is a negative lens having a bi-concave shape.

The lens data of the current embodiment is as follows.

| \multicolumn{5}{c}{EFL: 50.02 mm Fno: 2.0 2ω: 32°} | | | | |
|---|---|---|---|---|
| Surface | R | Th | nd | vd |
| 0 | INFINITY | D0 | | |
| 1 | 37.922 | 1.00 | 1.832080 | 22.9 |
| 2 | 22.330 | 0.48 | | |
| 3 | 23.306 | 5.89 | 1.763917 | 47.9 |
| 4 | −368.292 | 0.10 | | |
| 5 | 20.718 | 3.94 | 1.487000 | 70.5 |
| 6 | 29.560 | D1 | | |
| 7 | −137.854 | 1.00 | 1.617998 | 63.4 |
| 8 | 18.699 | D2 | | |
| ST | INFINITY | 11.20 | | |
| 10 | 56.437 | 3.47 | 1.774319 | 70.0 |
| 11 | −44.083 | 0.10 | | |
| 12 | 98.217 | 2.92 | 1.812801 | 44.1 |
| 13 | −52.506 | 3.03 | | |
| 14 | −33.398 | 1.00 | 1.786907 | 24.2 |
| 15 | 69.168 | 21.21 | | |

-continued

EFL: 50.02 mm Fno: 2.0 2ω: 32°

| Surface | R | Th | nd | vd |
|---------|---|----|----|-----|
| 16 | INFINITY | 2.80 | 1.516798 | 64.2 |
| 17 | INFINITY | 0.12 | | |
| IMG | | | | |

TABLE 3

| | Infinite range | Close range |
|---|---|---|
| D0 | Infinity | 431.8 |
| D1 | 4.15 | 7.3 |
| D2 | 6.32 | 3.17 |

Figure 6:
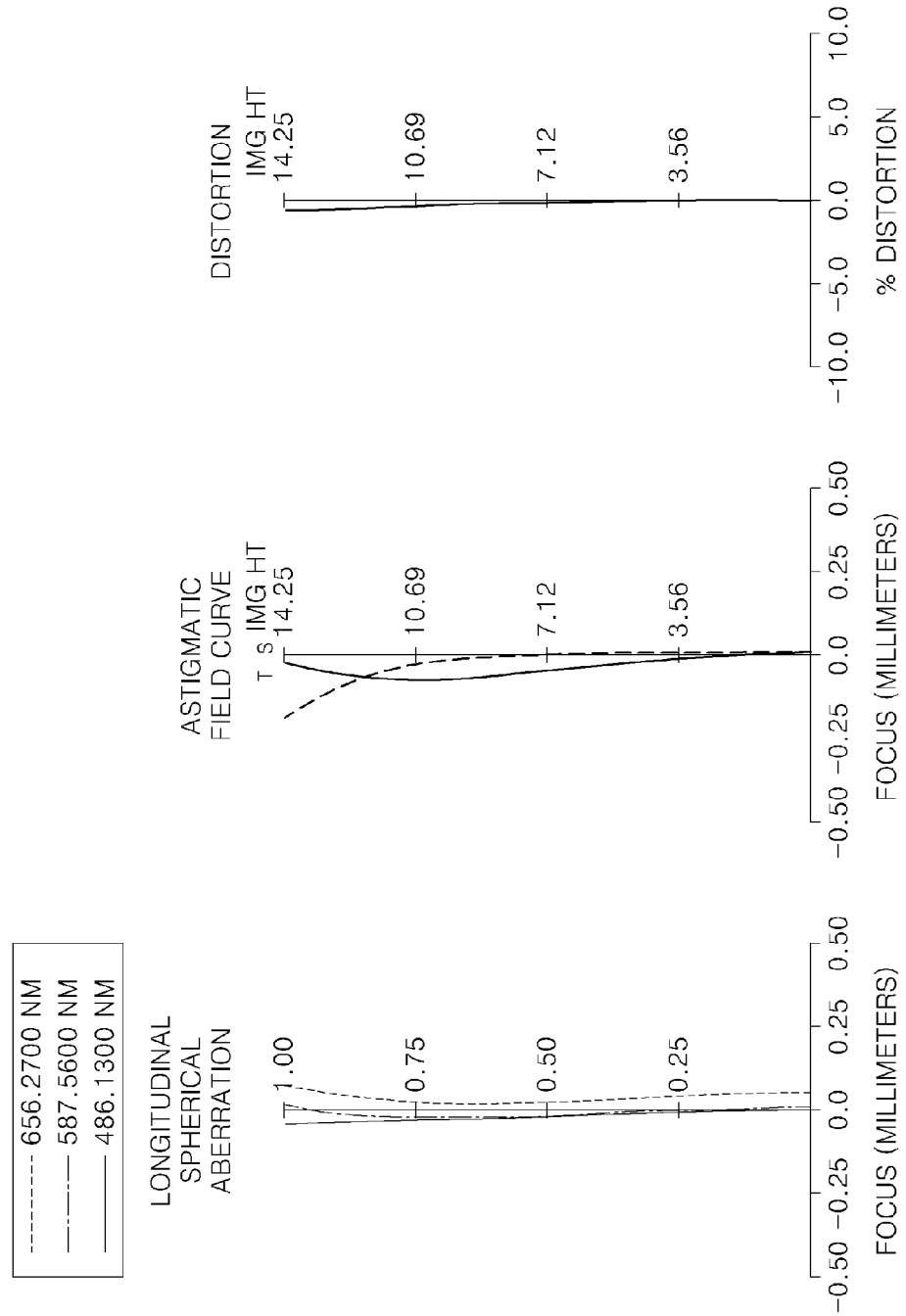
FIG. 6 shows aberration diagrams of spherical aberration, astigmatic field curve, and distortion when an object is located at an infinite position in the telephoto lens system of FIG. 5.

FIG. 6 shows aberration diagrams of longitudinal spherical aberration, astigmatic field curve, and distortion when an object is located at an infinite position in the telephoto lens system of FIG. 5.

<Fourth Embodiment>

Figure 7:
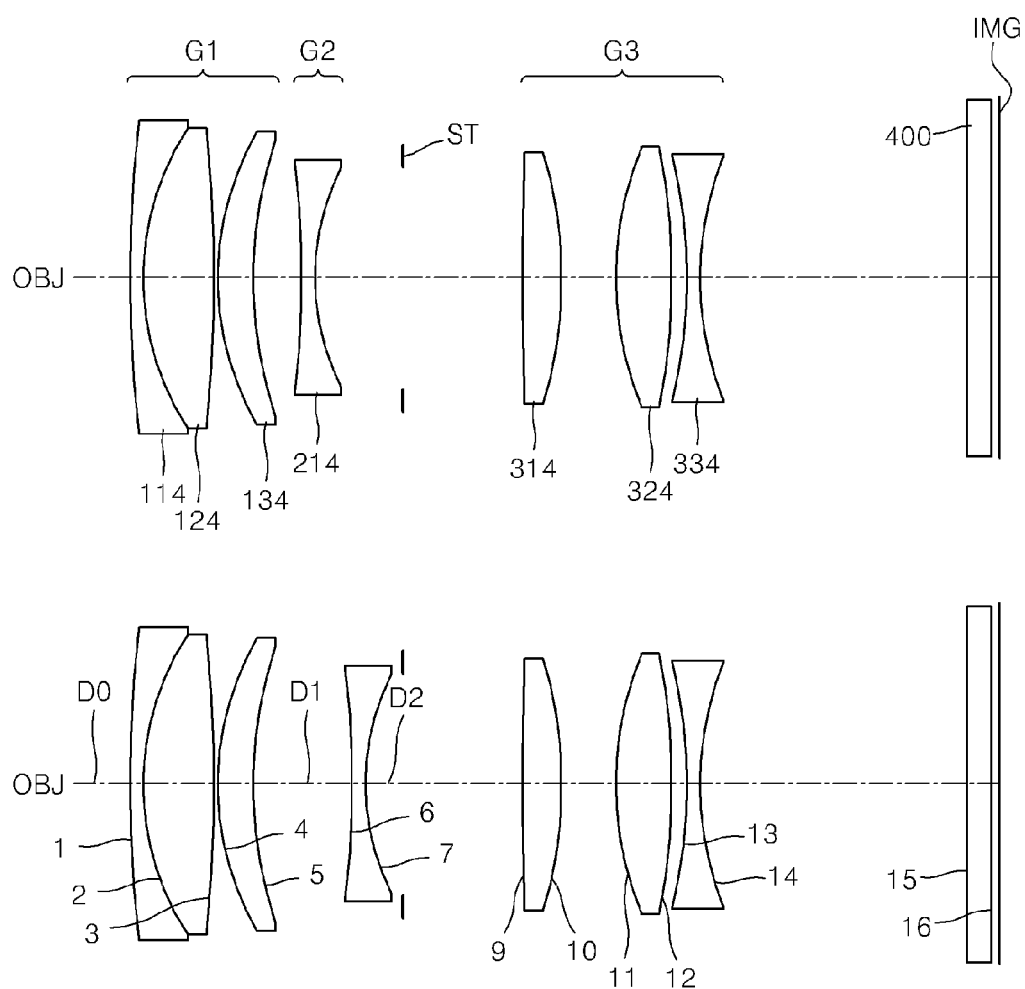
FIG. 7 is a view showing an optical arrangement of a telephoto lens system when an object is located at an infinite and nearest positions, according to another embodiment.

FIG. 7 is a view showing another embodiment of an optical arrangement of a telephoto lens system when an object is located at an infinite and nearest position. The telephoto lens system includes a first lens group G1 having a positive refractive power, a second lens group G2 having a negative refractive power, and a third lens group G3 having a positive refractive power. The first lens group G1 includes a first lens 114 which is a negative lens having a meniscus shape, a second lens 124 which is a positive lens, and a third lens 134 which is a negative lens. The first lens 114 and the second lens 124 together form a cemented lens. The second lens group G2 includes a fourth lens 214 which is a negative lens. The third lens group G3 includes a fifth lens 314 which is a positive lens having a convex shape toward an object, a sixth lens 324 which is a positive lens, and a seventh lens 334 which is a negative lens having a bi-concave shape.

The lens data of the current embodiment is as follows.

EFL: 43.8 mm Fno: 2.0 2 ω: 36.6°

| Surface | R | Th | nd | vd |
|---------|---|----|----|-----|
| 0 | INFINITY | D0 | | |
| 1 | 106.929 | 1.00 | 1.806099 | 33.3 |
| 2 | 21.582 | 5.78 | 1.729160 | 54.7 |
| 3 | −104.298 | 0.10 | | |
| 4 | 22.213 | 3.03 | 1.804200 | 46.5 |
| 5 | 36.887 | D1 | | |
| 6 | −81.867 | 1.00 | 1.534463 | 65.2 |
| 7 | 19.742 | D2 | | |
| ST | INFINITY | 9.49 | | |
| 9 | 350.000 | 3.13 | 1.772500 | 49.6 |
| 10 | −36.069 | 4.45 | | |
| 11 | 28.130 | 4.47 | 1.834810 | 42.7 |
| 12 | −52.565 | 1.22 | | |
| 13 | −42.536 | 1.00 | 1.784719 | 25.7 |
| 14 | 25.500 | 21.34 | | |
| 15 | INFINITY | 2.00 | 1.516798 | 64.2 |
| 16 | INFINITY | 0.10 | | |
| IMG | | | | |

TABLE 4

| | Infinite range | Close range |
|---|---|---|
| D0 | Infinity | 385.3 |
| D1 | 3.86 | 7.82 |
| D2 | 7.03 | 3.07 |

Figure 8:
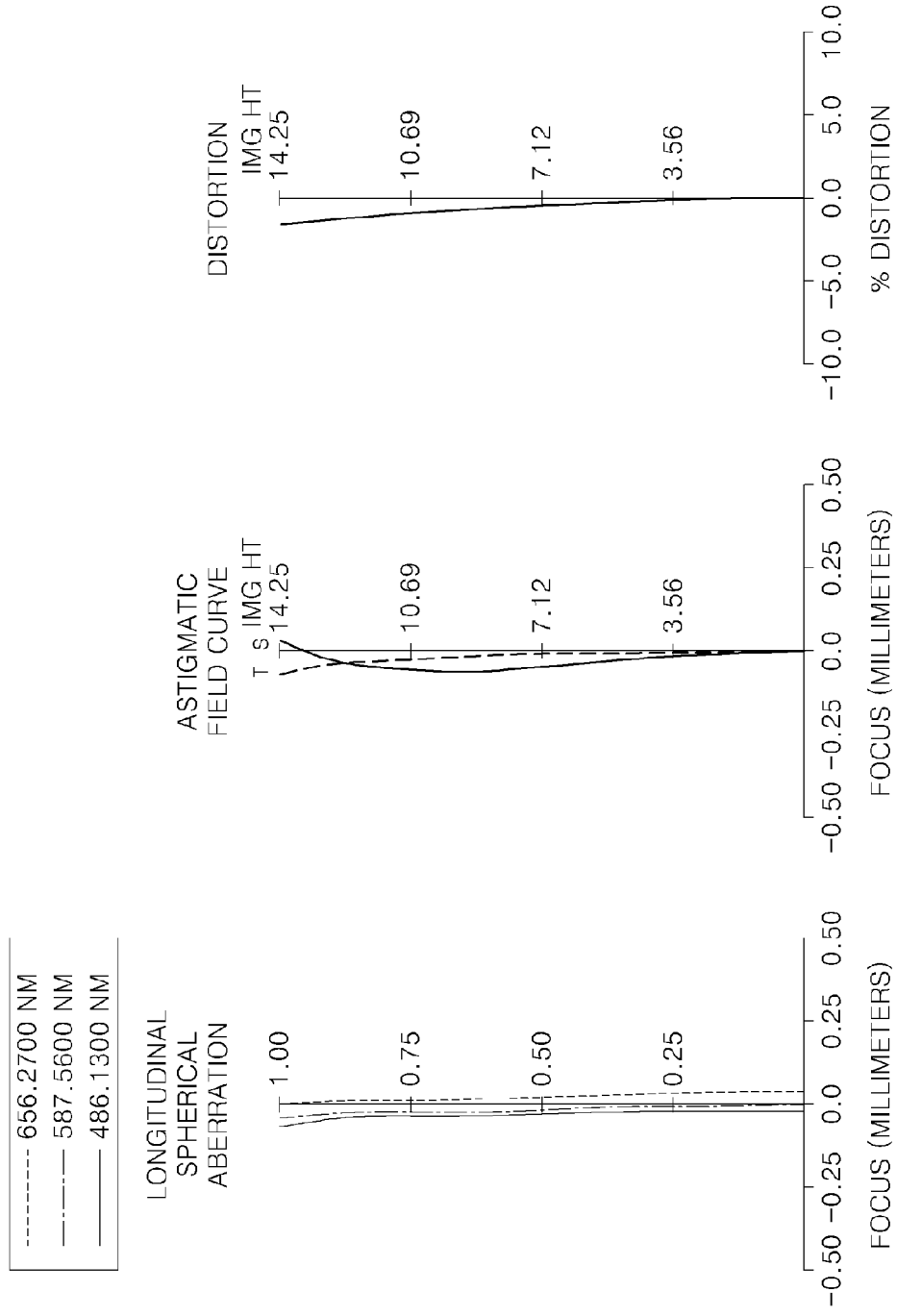
FIG. 8 show aberration diagrams of spherical aberration, astigmatic field curve, and distortion when an object is located at an infinite position in the telephoto lens system of FIG. 7.

FIG. 8 shows aberration diagrams of longitudinal spherical aberration, astigmatic field curve, and distortion when an object is located at an infinite position in the telephoto lens system of FIG. 7

The following table shows that the foregoing embodiments satisfy the above-described conditions.

TABLE 5

| Embodiment/Conditions | $|f_2/f|$ | $vd_2$ | $nd_3$ |
|---|---|---|---|
| First Embodiment | 0.684 | 63.4 | 1.811 |
| Second Embodiment | 0.6828 | 63.4 | 1.789 |
| Third Embodiment | 0.5314 | 63.4 | 1.791 |
| Fourth Embodiment | 0.6776 | 65.2 | 1.797 |

According to the above-described embodiments, a telephoto lens system, which is suitable for an electronic still camera or a video camera, is an inner-focusing type performing stable auto-focusing, and includes a lens having an F number of 1.8 to 2.0 and having a viewing angle of about 35° is provided.

The telephoto lens system according to the above-described embodiments may be used in various imaging devices including an imaging device that converts an optical image formed by the telephoto lens system into an electrical signal.

While the invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A telephoto lens system comprising:
a first lens group having a fixed position and a positive refractive power and comprising a negative lens that is disposed closest to an object side and has a meniscus shape that is convex toward the object;
a second lens group having a negative refractive power and consisting of a single negative lens that moves along an optical axis and performs focusing; and
a third lens group having a fixed position and a positive refractive power,
wherein the first through third lens groups are disposed sequentially from the object side toward the image side, and the telephoto lens system satisfies the condition:

$$0.5 < |f_2/f| < 0.81,$$

wherein $f_2$ denotes the focal length of the second lens group, and f denotes the focal length of the telephoto lens system.

2. The telephoto lens system of claim 1, wherein a positive lens having a convex shape toward the object side is disposed at a position closest to the object side in the third lens group.

3. The telephoto lens system of claim 1, wherein an Abbe number $vd_2$ of the second lens group satisfies the condition:

$$vd_2 > 63.$$

4. The telephoto lens system of claim 2, wherein an Abbe number $vd_2$ of the second lens group satisfies the condition:

$$vd_2 > 63.$$

5. The telephoto lens system of claim 1, wherein the telephoto lens system satisfies the condition:

$$nd_3 > 1.78,$$

wherein $nd_3$ denotes an average of refractive indexes of lenses constituting the third lens group.

6. The telephoto lens system of claim 2, wherein the telephoto lens system satisfies the condition:

$$nd_3 > 1.78,$$

wherein $nd_3$ denotes an average of refractive indexes of lenses constituting the third lens group.

7. The telephoto lens system of claim 3, wherein the telephoto lens system satisfies the condition:

$$nd_3 > 1.78,$$

wherein $nd_3$ denotes an average of refractive indexes of lenses constituting the third lens group.

8. The telephoto lens system of claim 4, wherein the telephoto lens system satisfies the condition:

$$nd_3 > 1.78,$$

wherein $nd_3$ denotes an average of refractive indexes of lenses constituting the third lens group.

9. The telephoto lens system of claim 1, further comprising an aperture diaphragm interposed between the second lens group and the third lens group.

10. The telephoto lens system of claim 1, wherein the first lens group comprises the negative lens having a meniscus shape, and further comprises a positive lens, and a positive lens, that are sequentially arranged from the object side to the image side.

11. The telephoto lens system of claim 1, wherein the third lens group comprises a positive lens, a positive lens, and a negative lens that are sequentially arranged from the object side to the image side.

12. An imaging apparatus comprising;
the telephoto lens system of claim 1; and
an imaging device converting an optical image formed by the telephoto lens system into an electrical signal.

* * * * *